(12) United States Patent
Xu et al.

(10) Patent No.: US 10,331,577 B2
(45) Date of Patent: Jun. 25, 2019

(54) METHOD AND DEVICE FOR PROTECTING DYNAMIC RANDOM ACCESS MEMORY

(71) Applicant: Montage Technology (Shanghai) Co., Ltd., Shanghai (CN)

(72) Inventors: Shuna Xu, Shanghai (CN); Guobing Mo, Shanghai (CN); Cheng-Tie Chen, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 33 days.

(21) Appl. No.: 15/068,657

(22) Filed: Mar. 14, 2016

(65) Prior Publication Data

US 2017/0185539 A1   Jun. 29, 2017

(30) Foreign Application Priority Data

Dec. 29, 2015   (CN) .......................... 2015 1 1019129

(51) Int. Cl.
*G06F 12/02*   (2006.01)
*G09C 1/00*   (2006.01)
(Continued)

(52) U.S. Cl.
CPC ...... *G06F 12/1483* (2013.01); *G06F 12/0292* (2013.01); *G06F 12/1408* (2013.01); *G06F 21/74* (2013.01); *G06F 21/79* (2013.01); *G09C 1/00* (2013.01); *G06F 2212/1052* (2013.01); *G06F 2212/20* (2013.01); *G06F 2212/402* (2013.01); *H04L 2209/60* (2013.01)

(58) Field of Classification Search
USPC ......................................................... 713/189
See application file for complete search history.

(56) References Cited

U.S. PATENT DOCUMENTS 5,978,903 A * 11/1999 Quimby .............. G06F 12/0623
                                                         711/209
9,678,780 B2 * 6/2017 Singh ...................... G06F 21/53
(Continued)

OTHER PUBLICATIONS

CoreAXI v3.1 Handbook, Microsemi, p. 14, Apr. 2015.
LogiCORE AXI Interconnect IP (v1.01.A), Xilinx, Inc., pp. 26-27, Dec. 14, 2010.

*Primary Examiner* — Taghi T Arani
*Assistant Examiner* — Badri Narayanan Champakesan
(74) *Attorney, Agent, or Firm* — Oliff PLC

(57) ABSTRACT

A method for DRAM protection comprises allocating address spaces respectively for a first and second common region, a first and second secure region; detecting whether common data has an address within the address spaces for the first secure region; outputting a digital signal remapping an address of the common data to the address space for the second common region if yes; detecting whether secure data has an address within the address spaces for the first common region; outputting a digital signal indicating remapping an address of the secure data to the address space for the second secure region if yes. Alternatively, the method further comprises generating a random key; an updated written data by permuting orders of bits of an original DRAM written data; generating an encrypted data by performing a function on the updated written data with the generated random key; and dynamically updating the generated random key.

15 Claims, 12 Drawing Sheets

(51) Int. Cl.
*G06F 12/14* (2006.01)
*G06F 21/79* (2013.01)
*G06F 21/74* (2013.01)

(56) References Cited

U.S. PATENT DOCUMENTS

| | | | | |
|---|---|---|---|---|
| 2005/0195975 | A1* | 9/2005 | Kawakita | H04L 9/0822 380/30 |
| 2006/0041711 | A1* | 2/2006 | Miura | G11C 7/20 711/103 |
| 2007/0220594 | A1* | 9/2007 | Tulsyan | G06F 21/31 726/5 |
| 2007/0294496 | A1* | 12/2007 | Goss | G06F 12/1408 711/163 |
| 2007/0300037 | A1* | 12/2007 | Rogers | G06F 12/0292 711/202 |
| 2008/0043686 | A1* | 2/2008 | Sperti | G06F 21/55 370/338 |
| 2008/0109592 | A1* | 5/2008 | Karamcheti | G06F 9/5016 711/103 |
| 2008/0109660 | A1* | 5/2008 | Mitra | G06F 12/0802 713/190 |
| 2011/0238886 | A1* | 9/2011 | Post | G06F 12/0246 711/103 |
| 2012/0036308 | A1* | 2/2012 | Swanson | G06F 12/1433 711/1 |
| 2012/0079171 | A1* | 3/2012 | Ju | G06F 12/0246 711/103 |
| 2013/0111219 | A1* | 5/2013 | Avanch | G06F 21/00 713/189 |
| 2014/0137263 | A1* | 5/2014 | Yokoyama | G06F 21/60 726/26 |
| 2014/0149653 | A1* | 5/2014 | Udipi | G11C 7/04 711/106 |
| 2014/0177370 | A1* | 6/2014 | Halbert | G11C 11/40603 365/222 |
| 2014/0195730 | A1* | 7/2014 | Feekes | G11C 11/40607 711/105 |
| 2014/0298039 | A1* | 10/2014 | Pandya | G06F 12/1408 713/190 |
| 2015/0033016 | A1* | 1/2015 | Thornton | H04L 9/0825 713/171 |
| 2015/0074339 | A1* | 3/2015 | Cheriton | G06F 12/0804 711/103 |
| 2015/0370727 | A1* | 12/2015 | Hashimoto | G06F 12/1416 711/163 |
| 2016/0085771 | A1* | 3/2016 | Miki | G06F 12/0238 707/824 |
| 2016/0232105 | A1* | 8/2016 | Goss | G06F 21/575 |
| 2016/0314078 | A1* | 10/2016 | Blake | G06F 12/1027 |
| 2016/0335200 | A1* | 11/2016 | Cambou | G11C 11/4094 |
| 2016/0371496 | A1* | 12/2016 | Sell | G06F 9/45558 |
| 2017/0075816 | A1* | 3/2017 | Okada | G06F 3/06 |
| 2017/0164201 | A1* | 6/2017 | Li | G06F 21/74 |
| 2017/0177457 | A1* | 6/2017 | Swanson | G06F 1/24 |
| 2017/0185804 | A1* | 6/2017 | Elbaz | G06F 13/287 |

\* cited by examiner

Remapping Enablement

| | |
|---|---|
| 1 | AWID/ARID=0,AWPROT/ARPROT=0 |
| 0 | AWID/ARID=0,AWPROT/ARPROT=1 |
| 1 | AWID/ARID=1,AWPROT/ARPROT=0 |
| 0 | AWID/ARID=1,AWPROT/ARPROT=1 |
| 1 | AWID/ARID=2,AWPROT/ARPROT=0 |
| 1 | AWID/ARID=2,AWPROT/ARPROT=1 |
| 0 | AWID/ARID=3,AWPROT/ARPROT=0 |
| 0 | AWID/ARID=3,AWPROT/ARPROT=1 |
| 1 | ...... |
| 1 | |
| 0 | |
| 0 | |
| 1 | |
| 0 | |
| 0 | AWID/ARID=n,AWPROT/ARPROT=0 |
| 1 | AWID/ARID=n,AWPROT/ARPROT=1 |

Remapping Table0

| ADDR_H | ADDR_L | OFFSET |
|---|---|---|
| ADDR_H | ADDR_L | OFFSET |
| .... | .... | .... |
| ADDR_H | ADDR_L | OFFSET |

MAX ← 16 groups → MIN

Remapping Table1

| ADDR_H | ADDR_L | OFFSET |
|---|---|---|
| ADDR_H | ADDR_L | OFFSET |
| .... | .... | .... |
| ADDR_H | ADDR_L | OFFSET |

MAX ← 16 groups → MIN

FIG. 4

METHOD AND DEVICE FOR PROTECTING DYNAMIC RANDOM ACCESS MEMORY

CROSS REFERENCE TO RELATED APPLICATION

This application claims priority to Chinese application No. 201511019129.8 entitled "Method and Device for Protecting Dynamic Random Access Memory," filed on Dec. 29, 2015 by Montage Technology (Shanghai) Co., Ltd., which is incorporated herein by reference.

TECHNICAL FIELD

The present invention relates to dynamic random access memory, and more particularly, but not limited to method and device for protecting dynamic random access memory.

BACKGROUND

Due to the shortcomings of the existing set-top box (STB) chip in terms of security, it is quite common for users to watch restricted programs without payment, and even users' passwords may be frequently stolen. In order to protect interests of operators, set-top box manufacturers and users, improvements to products' safety performances need to be considered from the chip design phases. Therefore, digital TV chips with advanced security features are designed.

However, there are some ways to get away or get around with the advanced security features. One is to detect the data access to DRAM over the DRAM interface, thus obtaining users' passwords and other critical security data. The other is to embed programs into the software installed by users to get directly from the DRAM and export security data (such as users' password, the plaintext copyrighted programs, etc.). Therefore, it is desirable to provide methods to handle the problems.

SUMMARY

An embodiment of the invention discloses a method for Dynamic Random Access Memory (DRAM) protection, comprising: allocating address spaces respectively for a first common region, a second common region, a first secure region and a second secure region; detecting whether common data has an address within the address spaces for the first secure region; outputting a digital signal indicating remapping an address of the common data to the address space for the second common region if the common data has the address within the address spaces for the first secure region; detecting whether secure data has an address within the address spaces for the first common region; outputting a digital signal indicating remapping an address of the secure data to the address space for the second secure region if the secure data has the address within the address spaces for the first common region.

Alternatively, the method further comprises generating a random key; generating an updated written data by permuting orders of bits of an original DRAM written data; generating an encrypted data by performing a function on used updated written data with the generated random key; and dynamically updating used random key according to time, when there is no request for accessing the DRAM.

Alternatively, the method further comprises generating a decrypted read data by performing a reverse function on a read data using a random key; generating a plain read data by reverse permuting orders of bits of the decrypted data.

Another embodiment of the invention discloses a device for Dynamic Random Access Memory (DRAM) protection, comprising: an allocating circuit, configured to allocate address spaces respectively for a first common region, a second common region, a first secure region and a second secure region; a detector configured to detect whether common data has an address within the address spaces for the first secure region; a remapping circuit configured to remap an address of the common data to the address space for the second common region if the common data has the address within the address spaces for the first secure data; the detector is further configured to detect whether secure data has an address within the address spaces for the first common region; the remapping circuit is further configured to remap an address of the secure data to the address space for the second secure region if the secure data has an address within the address spaces for the first common data.

Alternatively, the device for DRAM further comprises a key generator configured to generate a random key; a first data generator configured to generate an updated written data by permuting orders of bits of an original DRAM written data; the first data generator is further configured to generate an encrypted data by performing a function on the updated written data with used generated random key; and a first updating circuit configured to dynamically update the used random key according to time, when there is no request for accessing the DRAM.

Alternatively, the device for DRAM further comprises a second data generator configured to generate a decrypted read data by performing a reverse function on a read data using a random key; the second data generator is further configured to generate a plain read data by reverse permuting orders of bits of the decrypted data.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

FIG. 4 is a diagram illustrating address mapping table according to an embodiment of the invention.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
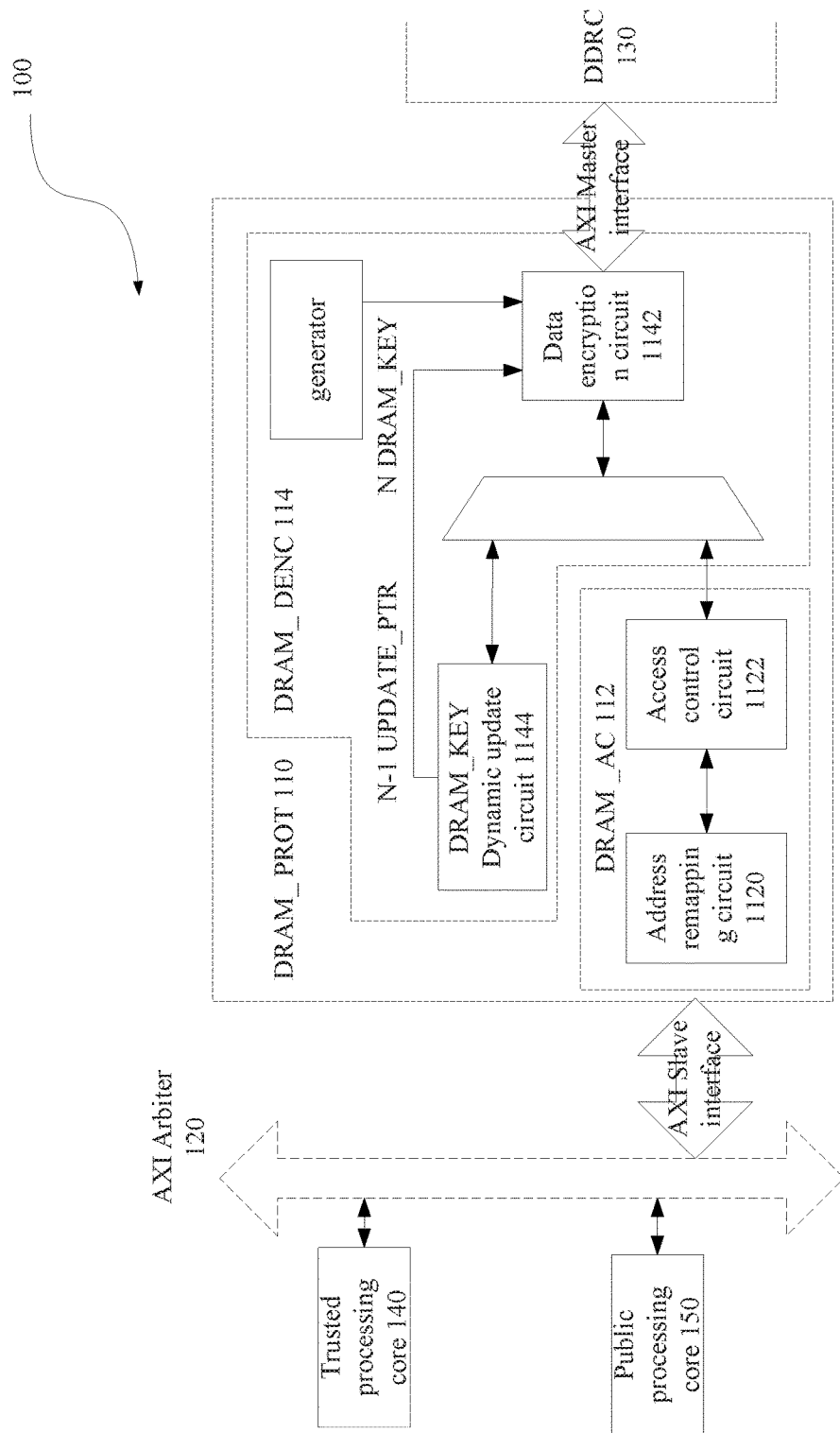
FIG. 1 is a diagram illustrating a system including a Dynamic Random Access Memory (DRAM) protection circuit according to an embodiment of the invention.

FIG. 1 is a diagram illustrating a system including a Dynamic Random Access Memory (DRAM) protection circuit 110 according to an embodiment of the invention. The system 100 comprises a DRAM protection circuit 110 or also called DRAM_PROT 110, an Advanced Extensible Interface (AXI) Arbiter 120, and a Double Data Rate Controller (DDRC or DDR) 130. The AXI Arbiter 120 is a device used in a shared memory system to decide, for each memory cycle, which master will be allowed to access that shared memory. Note master may include processing core, Video Decoder and other modules that access the shared memory. The DRAM PROT 110 is located between the AXI Arbiter 120 and the DDR 130. The AXI Arbiter 120 may be communicatively coupled with DRAM_PROT 110 using AXI slave interface. AXI bus is defined in AXI standard, whose description is omitted to avoid unnecessarily obscure the scope of the invention. The DDR 130 may be communicatively coupled with DRAM_PROT 110 using AXI master interfaces. The entire system realizes the function of DRAM data protection. The DRAM_PROT 110 can be divided into the access control circuit (referred to as DRAM_AC 112) and data encryption circuit (referred to as DRAM DENC 114), both of which are shown as dotted blocks.

DRAM_AC 112 is divided into the address remapping circuit 1120 and access control circuit 1122. The address remapping circuit 1120 realizes the address conversion from Rcom0 to Rsec1 and from Rsec0 to Rcom1 according to a configuration mapping table, so as to be compatible with different software address space schemes. Access control circuit 1122 controls access to the common region/security region for different access devices, so to filter out unauthorized access. The configuration information related to embodiments of the present invention is accessible by a trusted processing core 140, and the access requests for configuration information from the public processing core 150 are denied. Trusted processing core 140 is designed to perform security-related codes, whose security are usually carefully considered. Further, common third-party software is not allowed to be run on the trusted processing core 140 (except the security-related third party software, such as bank clients, etc.) Note an open product (for example, based on Android operating system) will allow customers to install various third-party software applications which are typically run on the public processing core 150. Therefore the security data generated in memory in the process when the trusted processing core 140 is running needs to be protected, and cannot be accessed by the public processing core 150 arbitrarily. These security data include audio and video data in plain text, intermediate data generated by security software (bank client software, etc.), etc. The DRAM access device includes the AXI Master on AXI interface, which initiates the transaction in the system. Each DRAM access device has a unique Write Address ID (AWID)/Read Address ID (ARID) according to embodiments of the invention. AWID, which is Write Address ID, is the identification tag for the write address group of signals. Further, ARID, which is Read Address ID, is the identification tag for the read address group of signals. (Note: AWID/ARID/AWPROT/ARPROT are all AXI protocol signals. AWPROT (Write Address Channel Protection Bits) and ARPROT (Read Address Channel Protection Bits will be discussed in more detail below).

Figure 2:
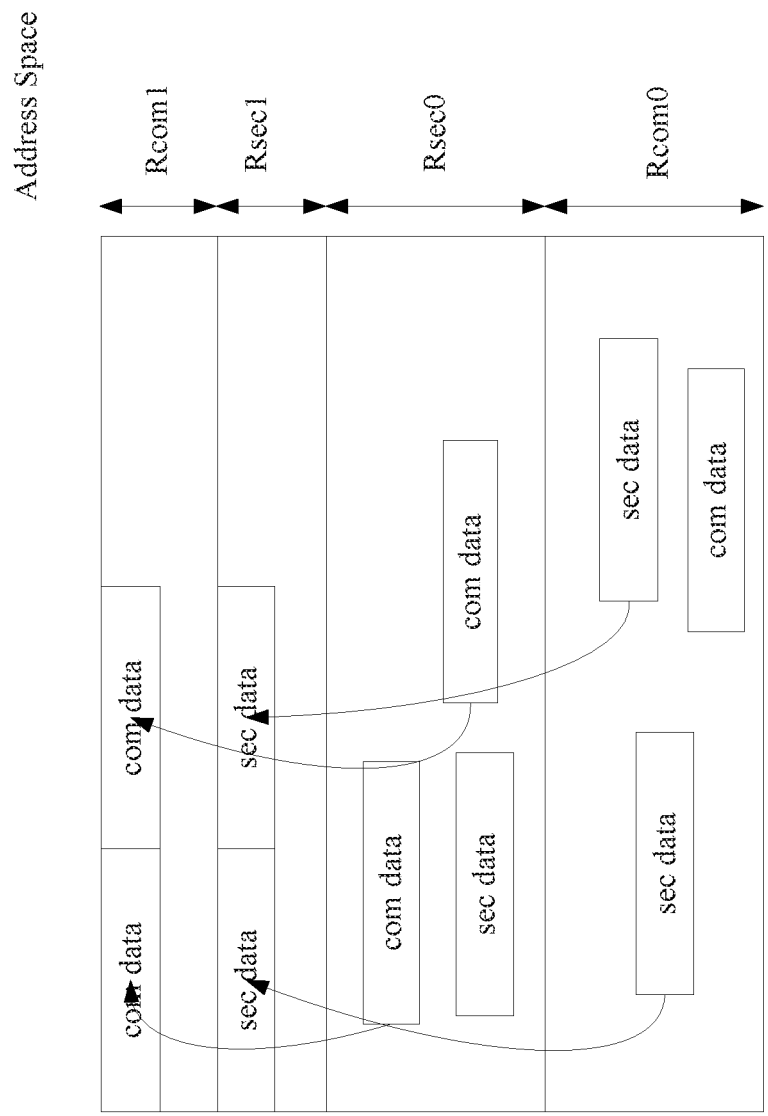
FIG. 2 is a diagram illustrating address remapping according to an embodiment of the invention.

FIG. 2 is a diagram illustrating address remapping according to an embodiment of the invention.

According to FIG. 2, the working principle for address remapping circuit 1120 is: the address remapping circuit 1120 configures, in addition to a first secure region Rsec0 and a first common region Rcom0, a second secure region Rsec1 and a second common region Rcom1. The first secure region Rsec0 may also be called basic secure region. The first common region Rcom0 may also be called basic common region. The second secure region Rsec1 may also be called supplement secure region. The second common region Rcom1 may also be called supplement common region.

The configuration mapping table remaps an address of common data (com data) that originally falls in Rsec0 address space to Rcom1 address space. Similarly, configuration mapping table remaps an address of secure data (sec data) that originally falls in Rcom0 address space to Rsec1 address space, which are shown in FIG. 2. Note FIG. 2 also shows that common data in the first common region Rcom0 is not remapped, as the common data is already within the correct address space, and the common data is maintained in their original address space. Similarly, the secure data in the first secure region Rsec0 is not remapped, as the secure data is already within the correct address space, and the secure data is maintained in their original address space.

Figure 3:
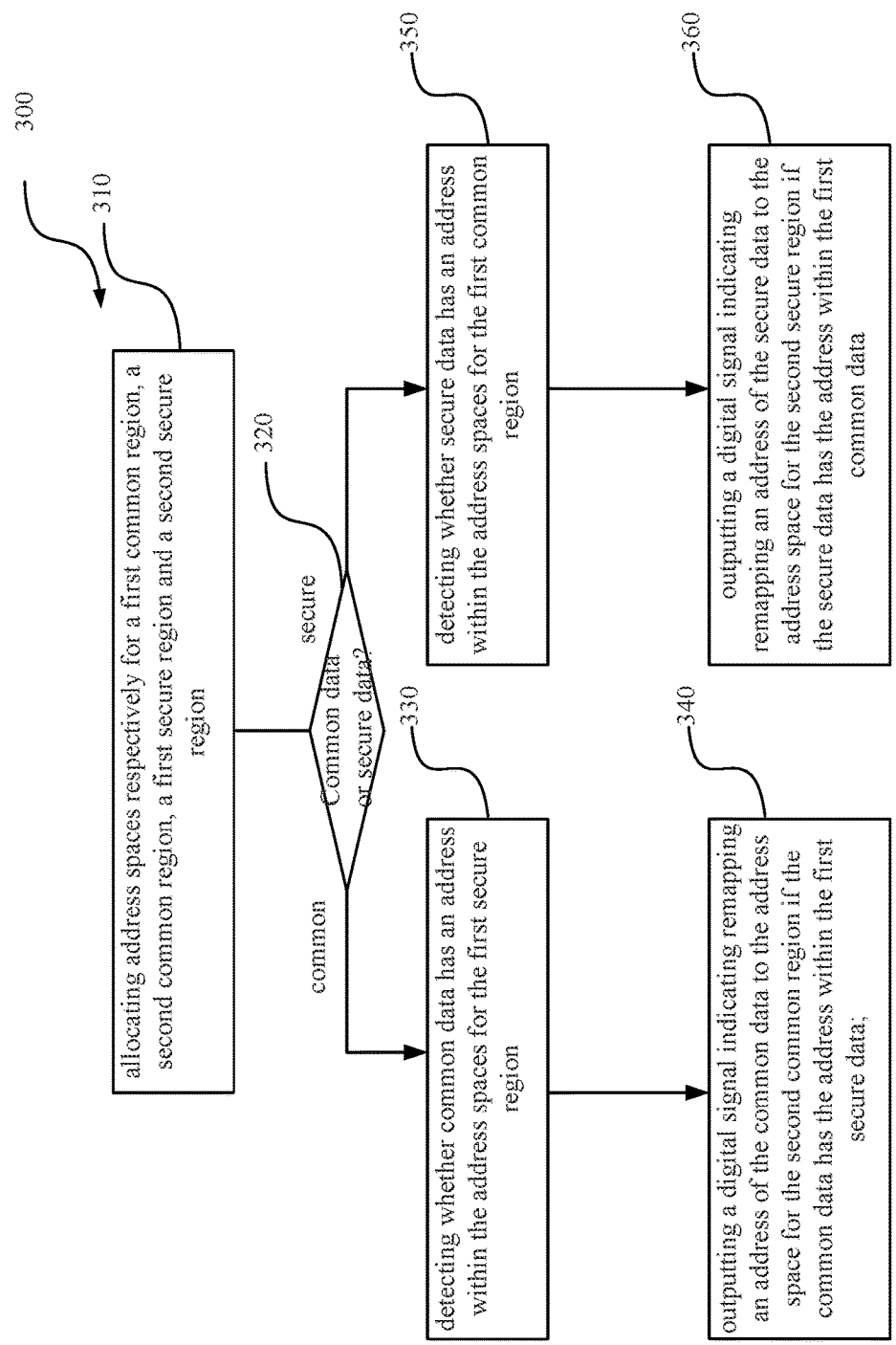
FIG. 3 is a flow chart illustrating a method 300 for Dynamic Random Access Memory (DRAM) protection according to an embodiment of the invention.

FIG. 3 is a flow chart illustrating a method 300 for Dynamic Random Access Memory (DRAM) protection. The method 300 comprises allocating, in block 310, address spaces respectively for a first common region Rcom0, a second common region Rcom1, a first secure region Rsec0 and a second secure region Rsec1, as illustrated in FIG. 2; and detecting, in block 320, whether common data or secure data are obtained.

When the common data are obtained, the method 300 further comprises detecting, in block 330, whether the obtained common data has an address within the address spaces for the first secure region, and outputting, in block 340, a digital signal indicating remapping an address of the common data to the address space for the second common region if the common data has the address within the address spaces for the first secure region.

When the secure data are obtained, the method 300 further comprises detecting, in block 350, whether the obtained secure data has an address within the address spaces for the first common region; and outputting, in block 360, a digital signal indicating remapping an address of the secure data to the address space for the second secure region if the secure data has the address within the address spaces for the first common region.

The method 300 determines whether data is secure data or common data according to AXI protocol signals, for example, AWPROT or ARPROT signal, as will be discussed with further details with respect to FIG. 4 and the following Permission Table 1. Table 1 shows an access control table. Wherein the bits correspond to corresponding bits in the configuration information.

Taken writing data as an example. The method 300 first detects AWID as shown in FIG. 4. The AWID is used to identify the device that initiates the transaction. Each pair of AWID/ARID has a corresponding permission Table 1. Note a AWID and a ARID are paired. For the ease of understanding, the AWID is first discussed.

For example, the written operation is first discussed. The method 300 first detects AWID=0. For example, the following permission Table 1 is corresponding to AWID=0. Then, the method 300 uses the following permission Table 1 and the region (Rcom0, Rcom1, Rsec0, Rsec1) to determine the type of transaction and whether the transaction is permitted. If the transaction is enabled according to the permission table, then the transaction is permitted. In other words, data is allowed to written into DDR 130. If the transaction is disabled, then the transaction is unpermitted. In other words, data is not allowed to written into DDR 130. Note both AWID and AWPROT are located in the command part of a transaction, and correspond to data. The corresponding relationship is guaranteed by AXI protocol.

In another example, the read operation is discussed. The method 300 first detects ARID=0. For example, the following permission Table 1 is corresponding to ARID=0. Then, the method 300 uses the following permission Table 1 and the region (Rcom0, Rcom1, Rsec0, Rse1) to determine the type of transaction and whether the transaction is permitted. If the transaction is enabled according to the permission table, then the transaction is permitted. In other words, the device is allowed to read data from DDR 130. If the transaction is disabled, then the transaction is unpermitted. In other words, the device is not allowed to read data from DDR 130. Note for a read operation, both ARID and ARPROT are located in the command part of a transaction, and correspond to data. The corresponding relationship is guaranteed by AXI protocol. Note according to Permission Table 1, AWPROT/ARPROT represent whether the data is common data or secure data.

PERMISSION TABLE 1

| Field | BIT | Description |
|---|---|---|
| Rcom0/Rcom1 Access control configuration | [0] | 1: Enable Write operation with AWPROT = 0<br>0: Disable Write operation with AWPROT = 0 |
| | [1] | 1: Enable Write operation with AWPROT = 1<br>0: Disable Write operation with AWPROT = 1 |
| | [2] | 1: Enable Read operation with ARPROT = 0<br>0: DisableRead operation with ARPROT = 0 |
| | [3] | 1: Enable Read operation with ARPROT = 1<br>0: Disable Read operation with ARPROT = 1 |
| Rsec0/Rsec1 Access control configuration | [4] | 1: Enable Write operation with AWPROT = 0<br>0: Disable Write operation with AWPROT = 0 |
| | [5] | 1: Enable Write operation with AWPROT = 1<br>0: Disable Write operation with AWPROT = 1 |
| | [6] | 1: Enable Read operation with ARPROT = 0<br>0: Disable Read operation with ARPROT = 0 |
| | [7] | 1: Enable Read operation with ARPROT = 1<br>0: Disable Read operation with ARPROT = 1 |

As shown in Permission Table 1, taken BIT [0] as an example, when BIT [0] equals 1, it means Write operation with AWPROT=0 is enabled. Otherwise, when BIT [0] equals 0, it means Write operation with AWPROT=0 is disabled. Taken BIT[7] as another example, when BIT [7] equals 1, it means Read operation with ARPROT=1 is enabled. When BIT [7] equals 0, it means Read operation with ARPROT=1 is disabled. Note this bit information is stored in the configuration information. Note Permission Table 1 is for illustrative purpose only. Those skilled in the art can configure the access control table with different numbers, orders or combinations, which are all within the scope of embodiments of the invention.

A written data is taken as an example to further illustrate Permission Table 1. For example, when the currently written data has AWPROT=0, it means that the currently written data includes secure data. Then bit [0] in the Permission Table 1 is used to determine whether the current transaction will allow the data to be written into Rcom0/Rcom1. Further, BIT [4] in the Permission Table 1 is used to determine whether the current transaction will allow the data to be written into Rsec0/Rsec1.

FIG. 4 is a diagram illustrating address mapping table according to an embodiment of the invention.

The address mapping table structure is shown in FIG. 4, which comprises two tables: remapping Table0 and remapping Table1. The advantage of using two tables allows dynamically updating the mapping relationships. The address remapping circuit 1120 updates the currently used remapping table when there is no transaction. Each remapping table comprises 16 groups of mapping information, and each group of information comprises ADDR_H, ADDR_L, and OFFSET. ADDR_H and ADDR_L define a range of the address. When the address remapping circuit 1120 detects the access address (ADDR) falls between ADDR_H and ADDR_L, the address remapping circuit 1120 will replace the access address ADDR with ADDR+OFFSET. In this manner, common data that is originally located in the address space within the first secure region has been remapped to the address within the address space for the second common region. Alternatively, secure data that is originally located in the address space within the first common region has been remapped to the address within the address space for the second secure region. Note although FIG. 4 shows two sets of remapping tables, that is, remapping table 0 and remapping table 1, the embodiments of the invention may be implemented with only one remapping table.

The address remapping circuit 1120 allows for setting different or same remapping enablement options for different transaction types for each device. The remapping enablement options are shown in FIG. 4, which have values of 0 or 1. 1 may represent the enablement option is open, in other words, the device is enabled to remap addresses. 0 may represent the enablement option is closed, in other words, the device is disabled to remap addresses. Alternatively, those skilled in the art may swap the meaning of 0 and 1. The enablement option is closed, in other words, the device is disabled to remap addresses when remapping is not needed, so as to maximize transaction efficiency.

For example, although not shown in FIG. 3, the method 300 may further comprise determining whether a device is enabled to remap addresses; if the device is not enabled to remap address, keep an original address of the common data or an original address of the secure data that the device is to access; if the device is enabled to remap address, remapping an address of the common data to the address space for the second common region if the common data has the address within the address spaces for the first secure region; or remapping an address of the secure data to the address space for the second secure region if the secure data has the address within the address spaces for the first common region.

Alternative, the method 300 further comprises maintaining a first remapping table and a second remapping table for both a first map between the address of the common data to the address space for the second secure region, and a second map between the address of the secure data to the address space for the second common region. The first remapping table is currently being used, and the second remapping table is idle. The method 300 further comprises updating the second remapping table with an updated first map and the second remapping map; directly using the second remapping table when updating the first remapping table and the updating of the second remapping table is completed. The advantage of using two remapping tables, for example, remapping table 0 and remapping table 1 shown in FIG. 4, is to enable dynamic updating of remapping tables without generating intermediate invalid values that may affect the remapping of addresses.

The remapping table may arrange the mapping information according to order of addresses, for example, in an ascending or a descending order. The address remapping circuit 1120 uses binary search method to locate the address, so as to increase searching efficiency.

For example, although not shown in FIG. 3, the method 300 may further comprise detecting whether common data has an address within the address spaces for the first secure region or detecting whether secure data has an address within the address spaces for the first common region is implemented using binary search.

Referring back to Permission Table 1 and FIG. 4, that AWPROT or ARPROT equal 0 (also represented as AWPROT/ARPROT=0) represents that the data is secure data, and that AWPROT or ARPROT equal 1 (also represented as AWPROT/ARPROT=1) represents that the data is common data.

Alternatively, referring back to Permission Table 1, the access control circuit 1122 performs transaction control based on authorization configuration information according to different transaction types of DRAM access device. The boundaries of Rsec0/Rsec1/Rcom0/Rcom1 are set by a group of registers. The group of registers is configured by the trusted processing core. Rsec0 and Rsec1 have the same authorization, and Rcom0 and Rcom1 have the same authorization. The access control circuit 1122 identifies different DRAM access devices according to AWID/ARID, and identifies different transaction types according to AWPROT/ARPROT. (AWPROT means Write Address Channel Protection Bits, and ARPROT means Read Address Channel Protection Bits.) Each DRAM access device has a corresponding configuration information as shown in Permission Table 1. The access control circuit 1122 performs transaction control based on the configuration information. The access control circuit 1122 will reject writing data when a request from the DRAM access device is an unpermitted write operation; or the access control circuit 1122 will return zero, when a request from the DRAM access device is an invalid read operation.

For example, although not shown in FIG. 3, the method 300 further comprises configuring a device ID and a transaction type for a device that access the address; and determining whether the device is allowed to access the address according to the transaction type and the device ID by comparing with an authorization table.

Figure 5:
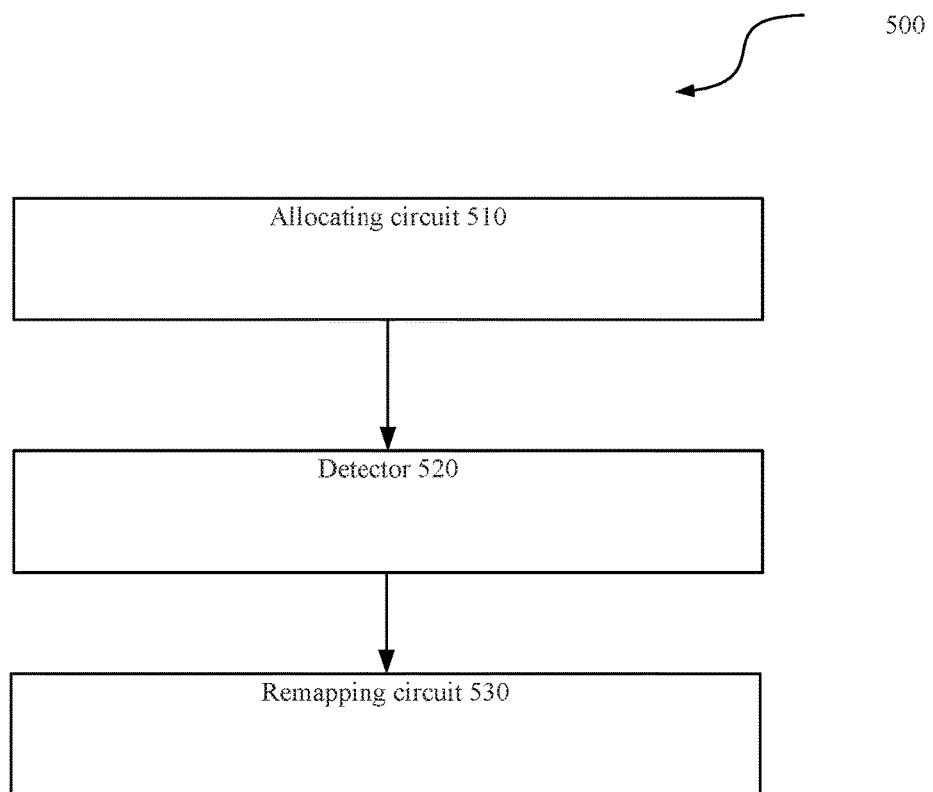
FIG. 5 is a block diagram illustrating a device for DRAM protection according to an embodiment of the invention.

FIG. 5 is a block diagram illustrating a device 500 for DRAM protection according to an embodiment of the invention. The device 500 comprises an allocating circuit 510, a detector 520 and a remapping circuit 530. The allocating circuit 510 allocates address spaces respectively for a first common region, a second common region, a first secure region and a second secure region. The detector 520 detects whether common data has an address within the address spaces for the first secure region. The remapping circuit 530 remaps an address of the common data to the address space for the second common region if the common data has the address within the address spaces for the first secure region. The detector 520 further detects whether secure data has an address within the address spaces for the first common region. The remapping circuit 530 further remaps an address of the secure data to the address space for the second secure region if the secure data has an address within the address spaces for the first common region. In an alternative embodiment, the detector 520 may determine whether the address for secure data or common data needs to be remapped, and outputs the remapping judgement as a digital signal to the remapping circuit 530. Then the remapping circuit 530 performs the corresponding remapping operation according to output from the detector 520.

Alternatively, the device 500 further comprises a determining circuit not shown in FIG. 5. The determining circuit determines whether a device that accesses the common data or the secure data is enabled to remap addresses. The remapping circuit 530 is further configured to, if the device is not enabled to remap address, keep an original address of the common data or an original address of the secure data; if the device is enabled to remap addresses, the remapping circuit 530 is further configured to remap an address of the common data to the address space for the second common region if the common data has the address within the address spaces for the first secure region; or remap an address of the secure data to the address space for the second secure region if the secure data has the address within the address spaces for the first common region.

Alternatively, the detector 520 detects whether common data has an address within the address spaces for the first secure region or detects whether secure data has an address within the address spaces for the first common region using binary search.

Alternatively, the allocating circuit 510 is further configured to configure a device ID and a transaction type for a device that access the address; and the determining circuit is further configured to determine whether the device is allowed to access the address according to the transaction type and the device ID by comparing with an authorization table.

Alternatively, the remapping circuit 530 is further configured to maintain a first remapping table and a second remapping table, each for both a first map between the address of the common data to the address space for the second secure region, and a second map between the address of the secure data to the address space for the second common region; wherein the first remapping table is currently being used, and the second remapping table is idle; update the second remapping table with an updated first map and the second map; and directly use the second remapping table when updating the first map and the second map is completed.

With the introduction of remapping circuit 530 into embodiments of the invention, a mapping mechanism between different software address space allocations is introduced. The remapping circuit 530 helps the software to complete the software-visible mapping from logical addresses to the underlying common region and security region. In this scenario, the software only needs to maintain a map of different products, and needs little or even none change to the original software code structure. Further, the address remapping method according to embodiments of the invention is compatible with the address remapping manner of different software program address spaces.

Figure 6:
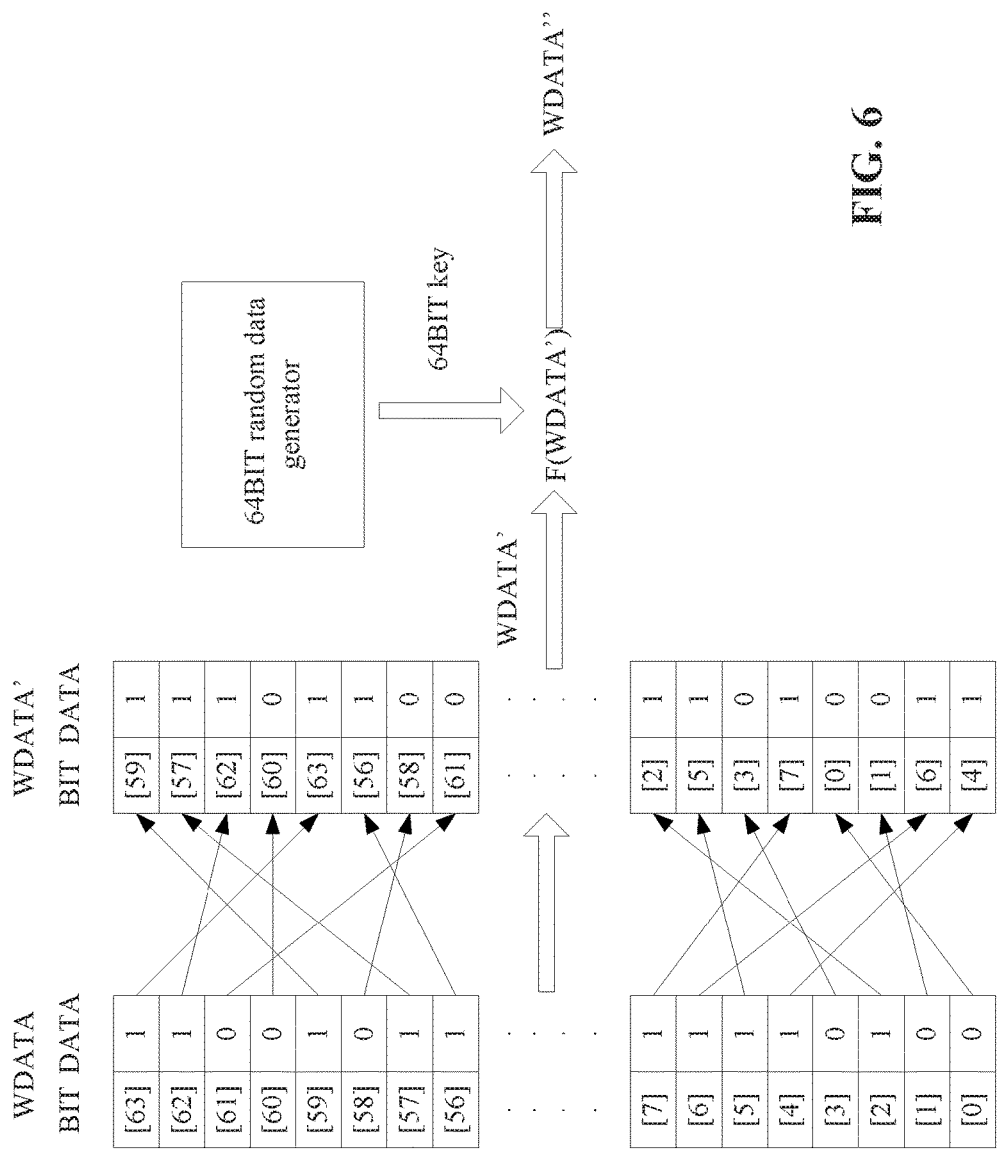
FIG. 6 is a diagram illustrating a data flow of data encryption algorithm circuit according to an embodiment of the invention.

FIG. 6 is a diagram illustrating a data flow of data encryption according to an embodiment of the invention. The data flow of data encryption will be discussed in details with reference with FIG. 1 and FIG. 7.

Referring back to FIG. 1, DRAM_DENC 114 implements the DRAM data encryption and decryption functions. DRAM_DENC 114 is mainly divided into data encryption circuit 1142, and DRAM_KEY Dynamic update circuit 1144. The data encryption circuit 1144 uses for example, 64-bit KEY to encrypt the data written to DRAM, and to decrypt data read out from the DRAM. The encryption algorithm is easy for the SOC (System On Chip) to implement, and does not affect DRAM access efficiency. The dynamic update circuit 1144 allows using N DRAM encryption KEYs during the system operation, as well as allow KEYs update, which greatly improves the security of the system.

Figure 7:
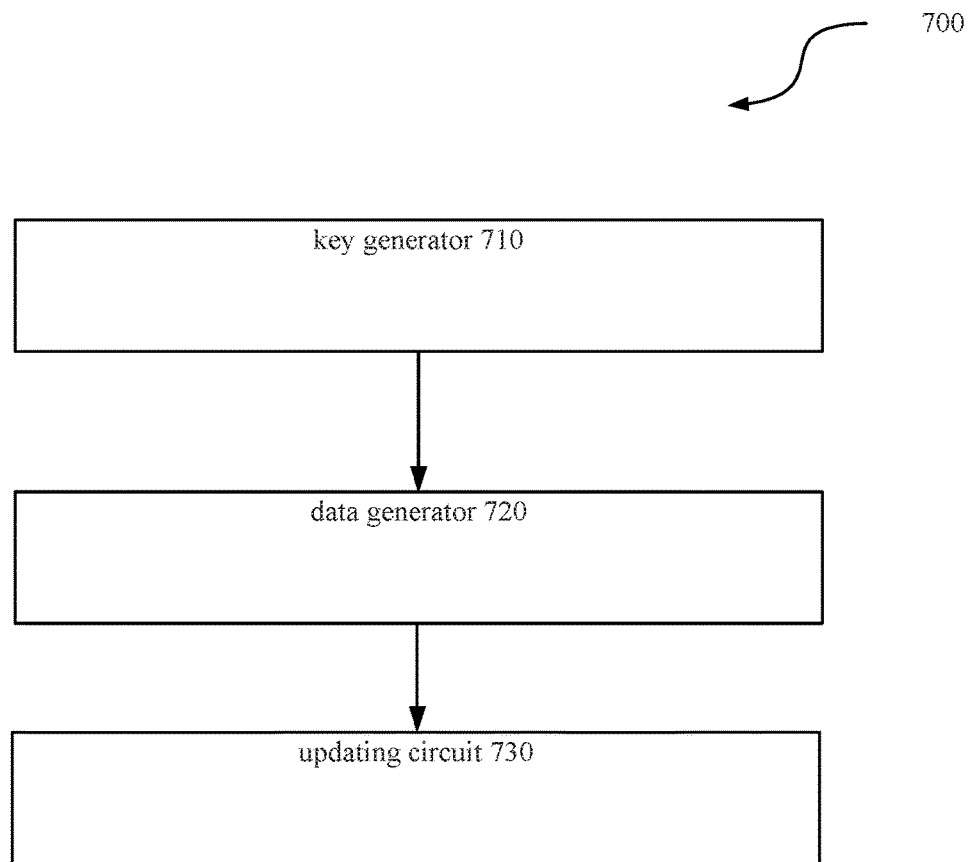
FIG. 7 is a block diagram illustrating a circuit for data encryption according to an embodiment of the invention.

FIG. 7 is a block diagram illustrating a circuit for data encryption according to an embodiment of the invention. As shown in FIG. 7, the circuit 700 for data encryption mainly comprises a key generator 710, a data generator 720 and an updating circuit 730. The key generator 710 is configured to generate a random key. The data generator 720 is configured to generate an updated written data by permuting orders of bits of an original DRAM written data. The data generator 710 further generates an encrypted data by performing a function on the updated written data with the generated random key. The updating circuit 730 dynamically updates the generated random key according to time, when there is no request for accessing the DRAM.

The key generator 710 may comprise, for example, a random number generator. The data generator 720 may be implemented by a bit permutation unit. The key generator 710 may further comprise an invertible function F(x) unit with the 64 BIT KEY generated by the random number generator as an input. The algorithm is easier for the SOC to implement than Advanced Encryption Standard (AES), Triple Data Encryption Standard (TDES) algorithm, without causing loss to DRAM transaction efficiency. With the introduction of random number generator, the same data will have different encryption results for different chips, different chips will have different encryption results, and each chip will have a different encryption result when the chip is started at different times, which greatly enhances the data security.

To be specific, for example, key generator 710 generates a 64 BIT DRAM protection KEY (DRAM_KEY). The KEY value differs each time the power is on, and the KEY value is unique for different chips. The DRAM_KEY is confidential, which cannot be read by public processing core. Note although the DRAM key is 64 bits according to an embodiment of the invention, those skilled in the art can use DRAM key of other bits.

The data generator 720 may permute the original write data WDATA, so as to generate new write data WDATA'. For example, the data generator 720 may perform BIT permutation within a byte of a single transaction for DRAM access. Alternatively, each Byte within the 64 bits data uses a unique permutation method from the other byte within the same 64 bits data. For example, as shown in FIG. 6, the first byte, i.e., bit [0]-bit[7], use a different permutation method from the permutation method used by the eighth byte, i.e., bit [56]-bit [63]. As shown in FIG. 6, the permutation is based on a bit unit. Alternatively, the permutation may be based on two-bit basis, or byte basis, etc.

The data generator 720 may further use 64 BIT DRAM KEY and WDATA' to perform F(x) function, so as to generate a final encrypted data. F(x) function can be any invertible function that is fed with a 64 BIT KEY, such as an XOR operation. For example, the final encryption data may be generated by: final encryption data WDATA"=F (WDATA')=WDATA'⊕DRAM KEY.

Since DRAM access is sensitive to access efficiency, on the one hand, it is impossible to use complicated data encryption algorithm, such as Advanced Encryption Standard (AES), Triple Data Encryption Standard (TDES), which consume much time for encryption and decryption. On the other hand, using a simple encryption algorithm will inevitably reduce security level. When the product is turned on for operation for a long-time, there is a risk that the encryption algorithm will be cracked. An embodiment of the present invention provides a method of dynamic updating DRAM_KEY, which enables N groups of DRAM encryption KEYs to be replaced during operating, and further increases the difficulty of cracking. N can be selected from any value greater than or equal to 2. N equals 4 is taken as an example and shown in FIG. 9.

Figure 8:
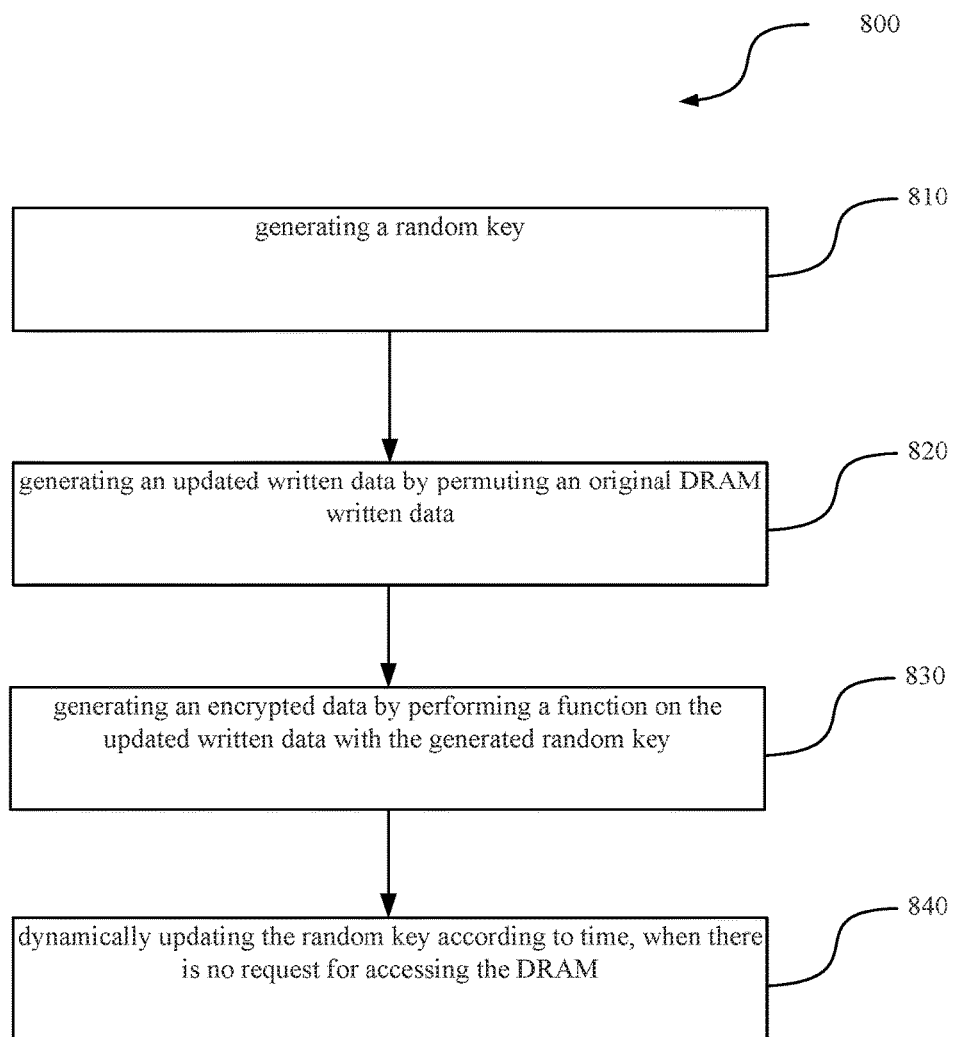
FIG. 8 is a diagram illustrating a method of dynamic updating of random keys according to an embodiment of the invention.

FIG. 8 is a diagram illustrating a method 800 of dynamic updating of random keys according to an embodiment of the invention. The method 800 comprises generating, in block 810, a random key; generating, in block 820, an updated written data by permuting orders of bits of an original DRAM written data; generating, in block 830, an encrypted data by performing a function on the updated written data with the generated random key; and dynamically updating, in block 840, the generated random key according to time, when there is no request for accessing the DRAM.

Figure 12:
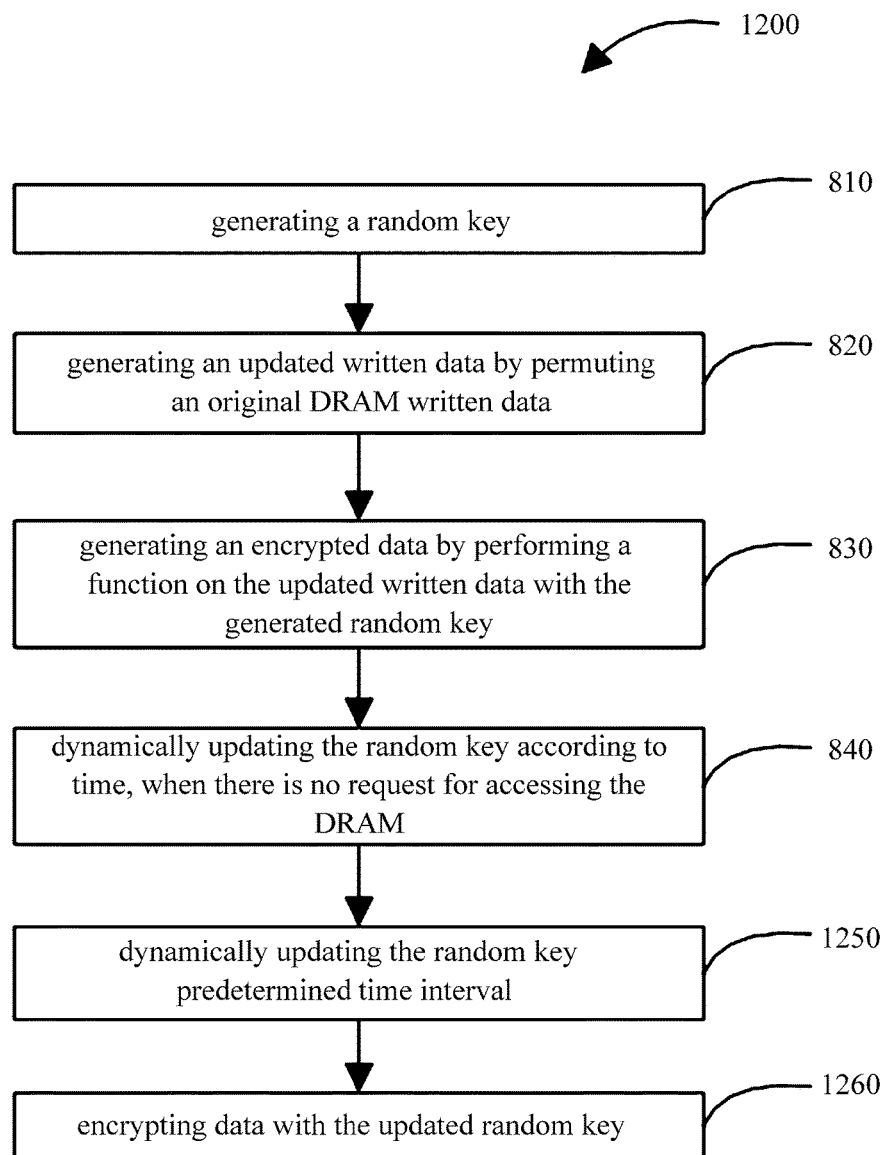
FIG. 12 is a diagram illustrating a method of dynamic updating of random keys according to an embodiment of the invention.

Alternatively, the method 800 may further comprise dynamically updating the random key in a predetermined time interval; and encrypting data with the updated random key. For example, FIG. 12 is an exemplary embodiment illustrating a method 1200 of dynamic updating of random keys. The method 1200 comprises generating, in block 810, a random key; generating, in block 820, an updated written data by permuting orders of bits of an original DRAM written data; generating, in block 830, an encrypted data by performing a function on the updated written data with the generated random key; dynamically updating, in block 840, the generated random key according to time, when there is no request for accessing the DRAM; dynamically updating, in block 1250, the random key in a predetermined time interval; and encrypting, in block 1260, data with the updated random key.

Figure 9:
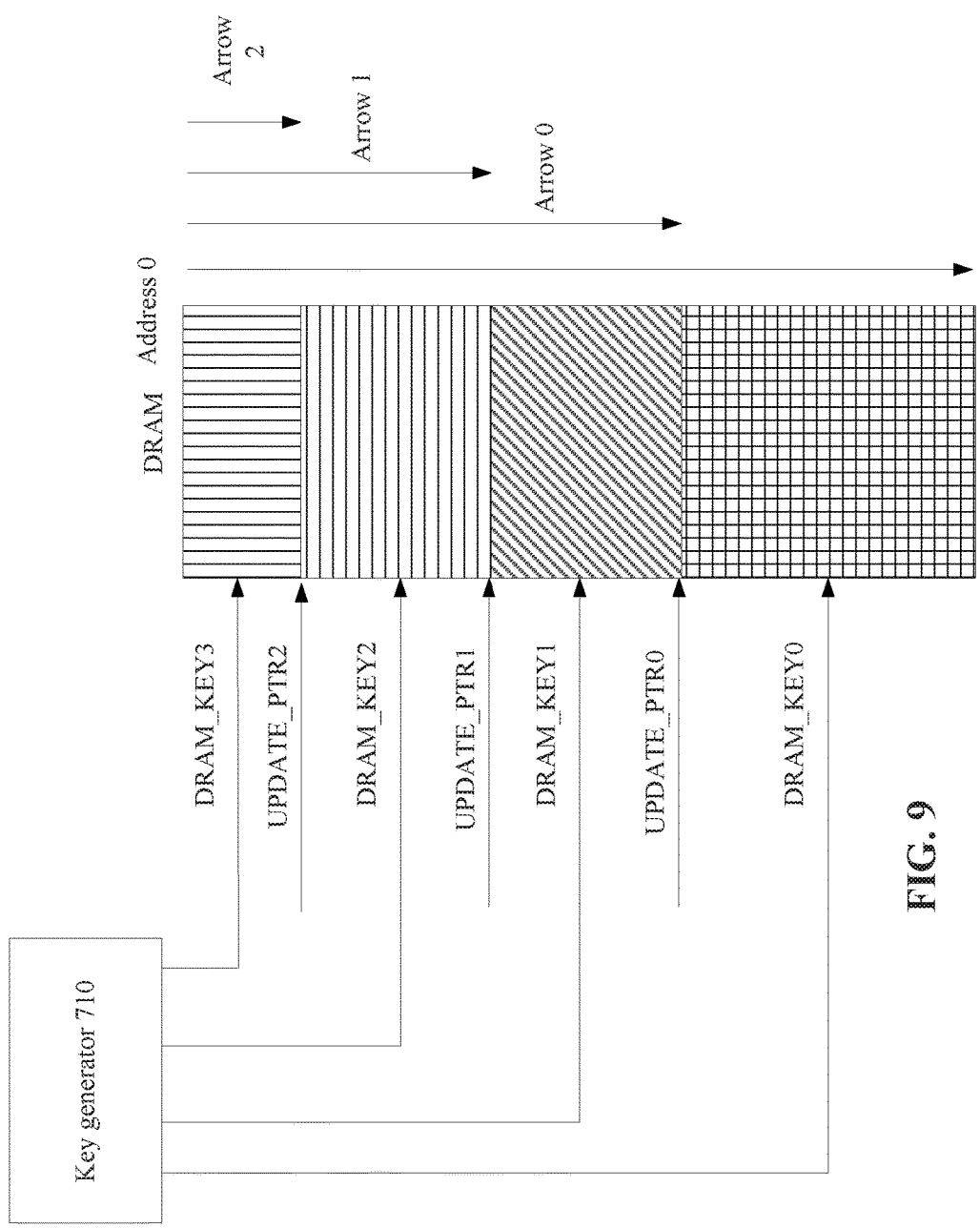
FIG. 9 is a diagram illustrating a time sequence for dynamic updating of DRAM keys according to another embodiment of the invention.

FIG. 9 is a diagram illustrating a method of dynamic updating of DRAM keys according to another embodiment of the invention.

To be specific, the key generator 710, for example, a random number generator generates four DRAM encryption KEYs, DRAM_KEY0~DRAM_KEY3. By default, after a system that includes the DRAM starts, the system first uses DRAM_KEY0 for DRAM access data encryption and decryption.

Referring back to FIG. 1 and with reference to FIG. 9, the DRAM_KEY dynamic update circuit 1144 is configured to update KEY dynamically. For example, (1) After random time interval TIME0, the DRAM_DENC 114 starts from address 0 to sequentially use DRAM_KEY1 to re-encrypt the memory data and then to write the re-encrypt the memory data back to memory, and feeds the current updated pointer UPDATE_PTR0 back to the data encryption circuit 1142. Referring to FIG. 9, address 0 is shown at the top of the DRAM. The direction that UPDATE_PTR0 moves is represented by Arrow 0. The encrypted or re-encrypted data refers to security data include the internal data of the entire DRAM (include both common data and secure data). Alternatively, in an embodiment, the encrypted or re-encrypted data may include secure data only.

(2) After random time interval TIME1, if the system 100 does not have any DRAM access request, the DRAM_DENC 114 starts from address 0 to sequentially use DRAM_KEY2 to re-encrypt the memory data and then to write the re-encrypt the memory data back to memory, and feeds the current updated pointer UPDATE_PTR1 back to the data encryption circuit 1142. The direction that UPDATE_PTR1 moves is represented by Arrow 1.

(3) After random time interval TIME2, if the system 100 does not have any DRAM access request, the DRAM_DENC 114 starts from address 0 to sequentially use DRAM_KEY3 to re-encrypt the memory data and then to write the re-encrypt the memory data back to memory, and feeds the current updated pointer UPDATE_PTR2 back to the data encryption circuit 1142. The direction that UPDATE_PTR2 moves is represented by Arrow 2.

The data encryption and decryption circuit 1142 encrypts and decrypts data in accordance with the following rules:

(1) When a device access a data with an address smaller than UPDATE_PTR2, which is shown in the DRAM area represented by a block filled with vertical lines.

The DRAM_DENC 114 uses DRAM_KEY3 for encrypting and decrypting normal read and write data.

(2) When a device accesses a data with an address larger than UPDATE_PTR2 and smaller than UPDATE_PTR1, which is shown in the DRAM area represented by a block filled with horizontal lines.

a) For a dynamic update circuit included in the DRAM_DENC 114, the DRAM_DENC 114 in the system 100 uses DRAM_KEY2 for decrypting read data, and uses DRAM_KEY3 to encrypt write data.

b) For a normal read/write operation by a DRAM access device, or a AXI master, such as a public processing core, or a video decoder, the DRAM_DENC 114 uses DRAM_KEY2 for decrypting normal read data, or for encrypting normal write data.

(3) When a device access a data with an address larger than UPDATE_PTR1 and smaller than UPDATE_PTR0, which is shown in the DRAM area represented by a block filled with slash lines.

a) For a dynamic update circuit included in the DRAM_DENC 114, the DRAM_DENC 114 in the system 100 uses DRAM_KEY1 for decrypting read data, and uses DRAM_KEY2 to encrypt write data.

b) For a normal read/write operation, the DRAM_DENC 114 uses DRAM_KEY1 for decrypting normal read data, or for encrypting normal write data.

(4) When a device access a data with an address larger than UPDATE_PTR0, which is shown in the DRAM area represented by a block filled with crossed lines.

a) The DRAM_DENC 114 uses DRAM_KEY0 for encrypting and decrypting normal read and write data.

b) for a dynamic update circuit included in the DRAM_DENC 114, the DRAM_DENC 114 in the system uses DRAM_KEY0 for decrypting read data, and uses DRAM_KEY1 for encrypting write data.

Further, when the DRAM_KEY dynamic update circuit 1144 completes a full cycle of memory data update, for example, the DRAM_KEY3 has finished updating the DRAM data at the end of the DRAM, for example, the bottom of the DRAM, the DRAM_DENC 114 performs the following operation and repeats:

(1) The DRAM_DENC 114 assigns the value of DRAM_KEY1 to DRAM_KEY0, assigns the value of DRAM_KEY2 to DRAM_KEY1, assigns the value of DRAM_KEY3 to DRAM_KEY2, and requests a 64 BIT new random number as DRAM_KEY3.

(2) The DRAM_DENC 114 assigns value of UPDATE_PTR1 to UPDATE_PTR0, assigns value of UPDATE_PTR2 to UPDATE_PTR1, and resets UPDATE_PTR2 to 0. Then a new round of dynamic encryption starts.

Alternatively, the DRAM_DENC 114 may have a pause feature so as to allow the system 100 to pause the dynamic update feature, in order to meet the bandwidth requirement.

The above embodiment uses 4 dynamic keys as an example for illustrating data encryption. Alternatively, if a number of N keys are used, the embodiment can be implemented as follows:

1. DRAM_KEYn-1 represents an original KEY used by the corresponding addressed area, and DRAM_KEYn represents the updated KEY.

For the data read request sent by the DRAM_KEY dynamic update circuit, DRAM_KEYn-1 is used for decrypting read data.

For the data write request sent by the DRAM_KEY dynamic update circuit, DRAM_KEYn is used for encrypting write data.

2. For the normal data read and write requests by a DRAM access device, also called a AXI master, such as a public processing core, or a video decoder:

(1) The DRAM_DENC 114 uses DRAM_KEYn+1 for data encryption and decryption when a device (such as a module within the chip that requests to access the address, such as a CPU, a video decoder) requests to access a data with an address less than UPDATE_PTRn;

(2) The DRAM_DENC 114 uses DRAM_KEYn for data encryption and decryption when a device requests to access a data with an address larger than UPDATE_PTRn.

In summary, the dynamic update for DRAM_KEY includes

1. DRAM_KEY dynamic update circuit 1144 performs memory data update if and only if the system 100 does not receive any DRAM access request.

2. Data update based on DRAM_KEYn are started from address 0, and the dynamic update circuit 1144 uses DRAM_KEYn to re-encrypt the memory data and then write the re-encrypt ed memory data back to memory, and returns the currently updated pointer UPDATE_PTRn-1 back to the data encryption circuit 1142. Although in FIG. 1, Dynamic update circuit 1144 and data encryption circuit 1142 are shown as separate circuits, they can be incorporated into one single circuit.

3. When a complete cycle of memory data has been updated, that is, all the DRAM_KEYn has completed encrypting the data, UPDATE_PTRn and DRAM_KEYn are replaced respectively.

4. The above steps 1-3 are always executed during product operation so to ensure DRAM KEYs are always dynamically updated.

5. Dynamic update can be paused when the system 100 needs.

Figure 10:
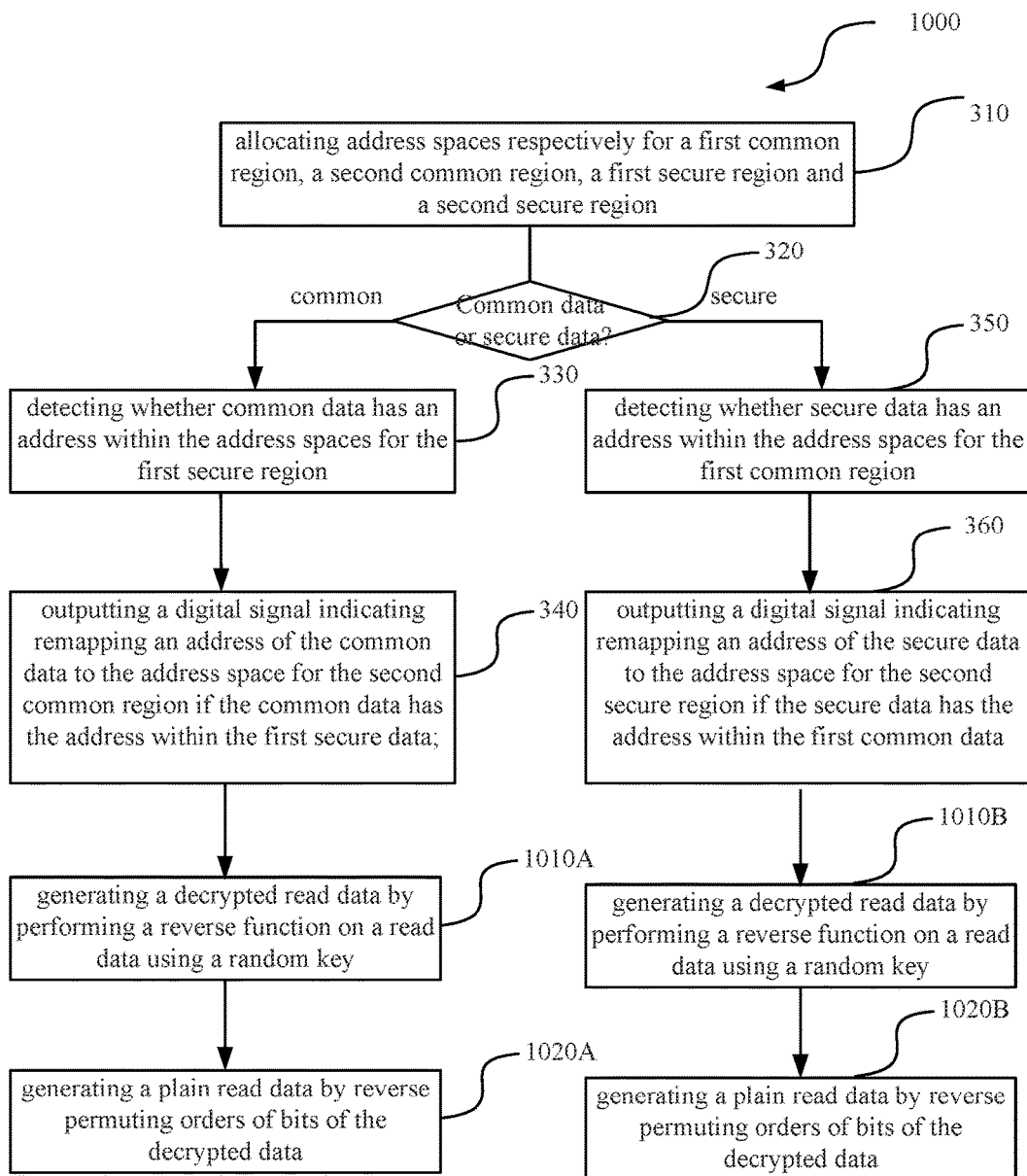
FIG. 10 is a flow chart illustrating a method of decryption according to an embodiment of the invention.

The description with respect to FIG. 8 illustrates a method of dynamically updating random keys for encryption. Alternatively, FIG. 10 is a diagram illustrating a method of decryption according to an embodiment of the invention. A method 1000 for Dynamic Random Access Memory (DRAM) protection, comprises allocating, in block 310, address spaces respectively for a first common region, a second common region, a first secure region and a second secure region; determining, in block 320, whether the read data is common data or secure data. If the read data is common data, the method 1000 further comprises detecting, in block 330, whether common data has an address within the address spaces for the first secure region; and in block 340, outputting a digital signal indicating remapping an address of the common data to the address space for the second common region if the common data has the address within the address spaces for the first secure region. The method 1000 further comprises generating, in block 1010A, a decrypted read data by performing a reverse function on a read data using a random key; and generating, in block 1020A, a plain read data by reverse permuting orders of bits of the decrypted data. Note the random key used in decryption with respect to FIG. 10 is the same as the random key used in encryption in method 800 with respect to FIG. 8.

If the read data is secure data, the method 1000 further comprises detecting, in block 350, whether secure data has an address within the address spaces for the first common region; outputting, in block 360, a digital signal indicating remapping an address of the secure data to the address space for the second secure region if the secure data has the address within the address spaces for the first common region. The method 1000 further comprises generating, in block 10106, a decrypted read data by performing a reverse function on a read data using a random key; and generating, in block 10206, a plain read data by reverse permuting orders of bits of the decrypted data. Note the random key used in decryption with respect to FIG. 10 is the same as the random key used in encryption in method 800 with respect to FIG. 8.

Figure 11:
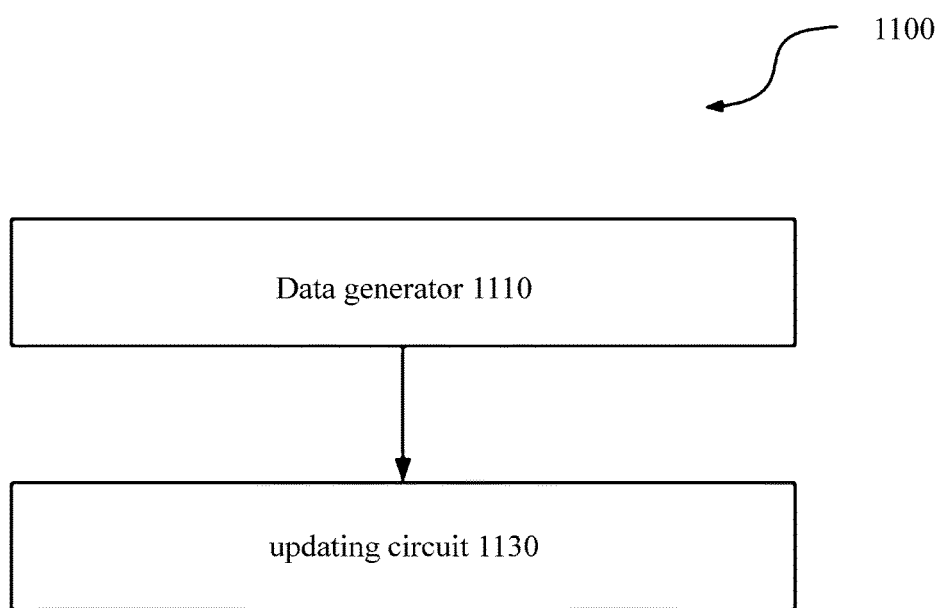
FIG. 11 is a circuit 1100 for data decryption according to an embodiment of the invention.

FIG. 11 is a circuit 1100 for data decryption according to an embodiment of the invention. As shown in FIG. 11, the circuit 1100 for data decryption includes a data generator 1110 and an updating circuit 1130. The data generator 1110 generates a decrypted read data by performing a reverse function on a read data using a random key; and generates a plain read data by reverse permuting orders of bits of the decrypted data. The updating circuit 1130 dynamically updates the generated random key according to time, when there is no request for accessing the DRAM. Alternatively, when the random key is not dynamically updated, the updating circuit 1130 may be omitted.

Embodiments of the invention uses easy data encryption algorithm, and the 64-bit encryption KEY uses a random number generator. The key is unique to the chip and the key is different upon each time the circuit is power up. Further, embodiments of the invention allows the use of N groups DRAM dynamic encryption KEY, which greatly increases the difficulty for cracking.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A method for Dynamic Random Access Memory (DRAM) protection, comprising:

allocating address spaces respectively for a first common region, a second common region, a first secure region and a second secure region;

detecting whether common data has an address within the address spaces for the first secure region;

outputting a digital signal indicating remapping the address of the common data to an address space for the second common region if the common data has the address within the address spaces for the first secure region;

detecting whether secure data has an address within the address spaces for the first common region;

outputting a digital signal indicating remapping the address of the secure data to an address space for the second secure region if the secure data has the address within the address spaces for the first common region;

generating a random key;

maintaining a first table and a second table for both a first map between the address of the common data to the address space for the second secure region, and a second map between the address of the secure data to the address space for the second common region, wherein the first table is currently being used, and the second table is idle;

updating the second table with an updated first map and the second map; and when the updated of the second table is completed, directly using the second table when updating the first table.

2. The method of claim 1, further comprising:

determining whether a device is enabled to remap addresses;

if the device is not enabled to remap address, keep an original address of the common data or an original address of the secure data that the device is to access; and if the device is enabled to remap address, remapping an address of the common data to the address space for the second common region if the common data has the address within the address spaces for the first secure region; or remapping an address of the secure data to the address space for the second secure region if the secure data has the address within the address spaces for the first common region.

3. The method of claim 1, wherein detecting whether the common data has the address within the address spaces for the first secure region or detecting whether the secure data has the address within the address spaces for the first common region is implemented using binary search.

4. The method of claim 1, further comprising:

configuring a device ID and a transaction type for a device that access the address; and determining whether the device is allowed to access the address according to the transaction type and the device ID by comparing with an authorization table.

5. A method of claim 1, further comprising:

generating a decrypted read data by performing a reverse function on a read data using a random key; and generating a plain read data by reverse permuting orders of bits of the decrypted data.

6. A device for Dynamic Random Access Memory (DRAM) protection, comprising:

one or more processors that execute a program to function as:

an allocating circuit, configured to allocate address spaces respectively for a first common region, a second common region, a first secure region and a second secure region;

a detector configured to detect whether common data has an address within the address spaces for the first secure region;

a remapping circuit configured to remap the address of the common data to an address space for the second common region if the common data has the address within the address spaces for the first secure region, wherein the detector is further configured to detect whether secure data has an address within the address spaces for the first common region, and the remapping circuit is further configured to:
  remap the address of the secure data to an address space for the second secure region if the secure data has an address within the address spaces for the first common region;
  maintain a first table and a second table for both a first map between the address of the common data to the address space for the second secure region, and a second map between the address of the secure data to the address space for the second common region, wherein the first table is currently being used, and the second table is idle;
  update the second table with an updated first map and the second map; and
  when the updated of the second table is completed, directly use the second table to update the first table.

7. The device of claim 6, wherein the one or more processors execute a program to function as:
  a determining circuit, configured to determine whether a device is enabled to remap address, wherein
  the remapping circuit is further configured to, if the device is not enabled to remap address, keep an original address of the common data or an original address of the secure data that the device is to access, and
  if the device is enabled to remap addresses, the remapping circuit is further activated to: remap an address of the common data to the address space for the second common region if the common data has the address within the address spaces for the first secure region; or remap an address of the secure data to the address space for the second secure region if the secure data has the address within the address spaces for the first common region.

8. The device of claim 6, wherein the detector detects whether the common data has the address within the address spaces for the first secure region or detecting whether the secure data has the address within the address spaces for the first common region using binary search.

9. The device of claim 6, wherein
  the allocating circuit is further configured to configure a device ID and a transaction type for a device that access the address, and
  the determining circuit is further configured to determine whether the device is allowed to access the address according to the transaction type and the device ID by comparing with an authorization table.

10. A device according to claim 6, wherein the one or more processors execute a program to function as:
  a second data generator configured to generate a decrypted read data by performing a reverse function on a read data using a random key, wherein
  the second data generator is further configured to generate a plain read data by reverse permuting orders of bits of the decrypted data.

11. The device of claim 10, wherein the one or more processors execute a program to function as:
  a second updating circuit configured to dynamically update the generated random key according to time, when there is no request for accessing the DRAM.

12. The method of claim 1, further comprising:
  generating a random key;
  generating an updated written data by permuting orders of bits of an original DRAM written data;
  generating an encrypted data by performing a function on used updated written data with the generated random key; and
  dynamically updating used random key according to time, when there is no request for accessing the DRAM.

13. The device of claim 6, further comprising:
  a key generator configured to generate a random key;
  a first data generator configured to: generate an updated written data by permuting orders of bits of an original DRAM written data; and generate an encrypted data by performing a function on the updated written data with used generated random key; and
  a first updating circuit configured to dynamically update the used random key according to time, when there is no request for accessing the DRAM.

14. The method of claim 12, further comprising:
  dynamically updating the random key in a predetermined time interval; and
  encrypting data with the updated random key.

15. The device of claim 13, wherein the updating circuit is further configured to:
  dynamically update the random key in a predetermined time interval; and
  the device further comprises an encrypting circuit configured to encrypt data with the updated random key.

* * * * *